G. Focht,
Hoisting Bucket.
N° 18,540. Patented Nov. 3, 1857.
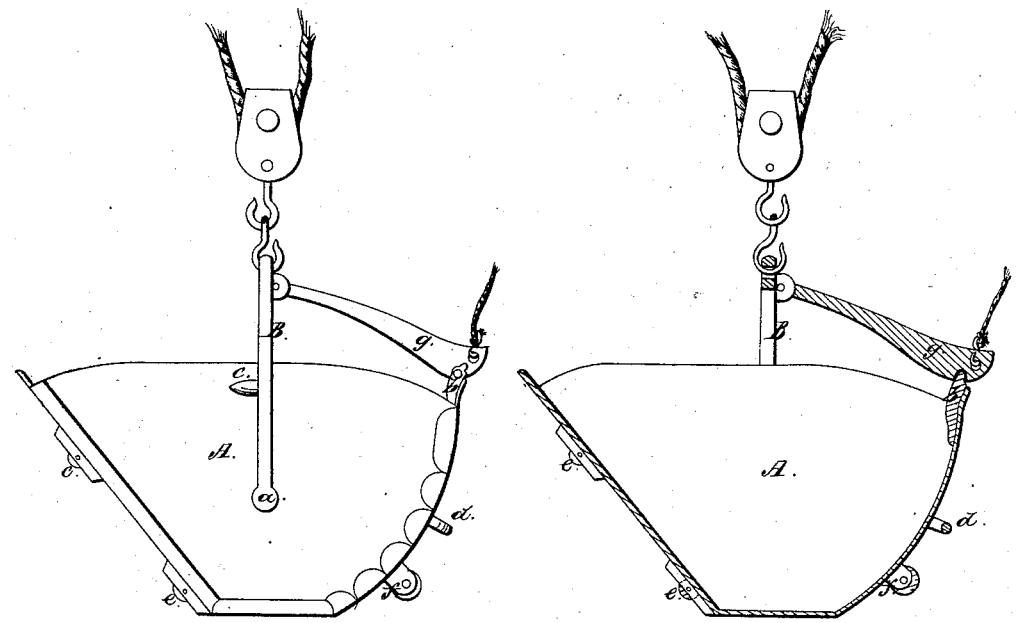
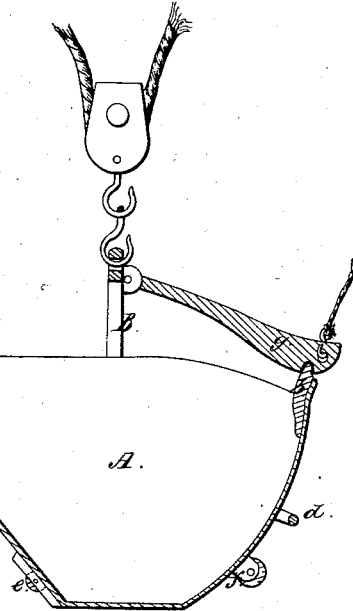
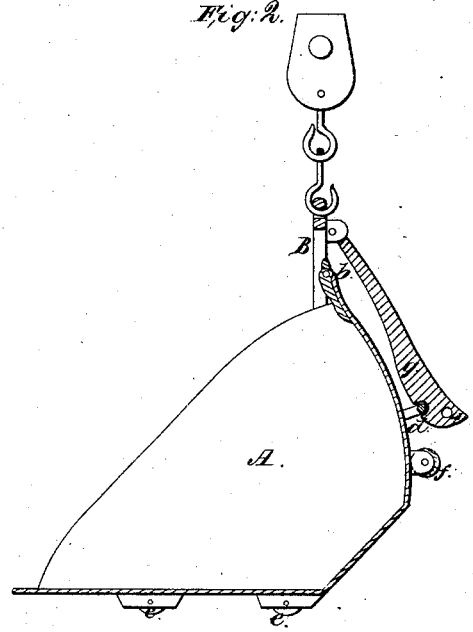
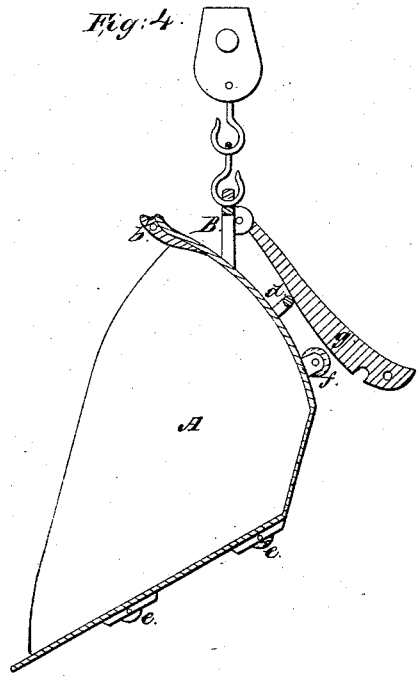

UNITED STATES PATENT OFFICE.

GEORGE FOCHT, OF READING, PENNSYLVANIA.

HOISTING-BUCKET.

Specification of Letters Patent No. 18,540, dated November 3, 1857.

*To all whom it may concern:*

Be it known that I, GEORGE FOCHT, of Reading, county of Berks, in the State of Pennsylvania, have invented a new and useful Improvement in Hoisting-Buckets; and I do hereby declare that the following is a full and exact description thereof, reference being had to the accompanying drawings and to the letters of reference marked thereon.

The nature of my invention consists in certain improvements in buckets for hoisting coal grain and other material.

To enable others skilled in the art to make and use my invention, I shall proceed to describe the same, reference being had to the accompanying drawings forming part of this specification.

Figure 1 is a side elevation; Figs. 2, 3 and 4 vertical sections taken through the center of my bucket, showing its different positions.

The bucket A is made of sheet iron or any other suitable material, of the form shown in the drawing. The handle B is hinged by the pivots $a$ to either side of the bucket, near its center, and at the top is furnished with an eye or other contrivance suitable to hoist it by.

The catch lever $g$ is at one end jointed to the handle B, just behind the suspension point and is curved so as to fit around the back of the bucket, the disengaged end being formed into a hook, which when the handle is thrown forward until it strikes the stops $c$, just reaches and falls into the lip and roller $b$, in which position—shown in Figs. 1 and 3—when the bucket is suspended by the handle, any weight has a tendency to hold it more securely.

When the bucket is in the position shown at Fig. 2, the catch bar is hooked into the staple $d$ and the bucket ready to be filled.

Having now described all the parts of my invention I will proceed with its mode of operation. Suppose the bucket to be standing upon the ground, or deck of the vessel to be unloaded, in the position shown by the section Fig. 2, it is filled by sliding forward upon the small rollers $e$, $e$, into the mass of grain or other matter to be hoisted. As soon as it is full the handle B is thrown forward against the stops $c$, when the hook end of the catch lever $g$ will fall into the slotted lip J, the rope being now pulled and the bucket hoisted, the weight within will keep it in its proper position, until when the catch lever $g$ is raised, the bucket becomes free to move on its centers ($a$) and the load may be dumped. Much inconvenience has been experienced by locking the handle at the front edge of the bucket, from interference with the load, especially when coal or any substance in large lumps, is to be raised; I therefore use the catch lever locking to the back edge and thereby secure all the advantages of the other arrangement without its inconveniences.

Having now fully described the construction and operation of my invention, what I claim and desire to secure by Letters Patent, is—

The catch lever $g$ in combination with the lip or roller $b$ and the staple $d$; the whole arranged substantially as and for the purposes herein set forth.

In testimony whereof I have hereunto set my hand and seal this thirtieth day of October 1857.

GEORGE FOCHT. [L. S.]

Witnesses:
 DAN T. HALL,
 GEORGE PRINTZ.